G. E. PALMER.
SYSTEM OF ELECTRICAL DISTRIBUTION.
APPLICATION FILED NOV. 23, 1904.
961,313.
Patented June 14, 1910.
3 SHEETS—SHEET 1.
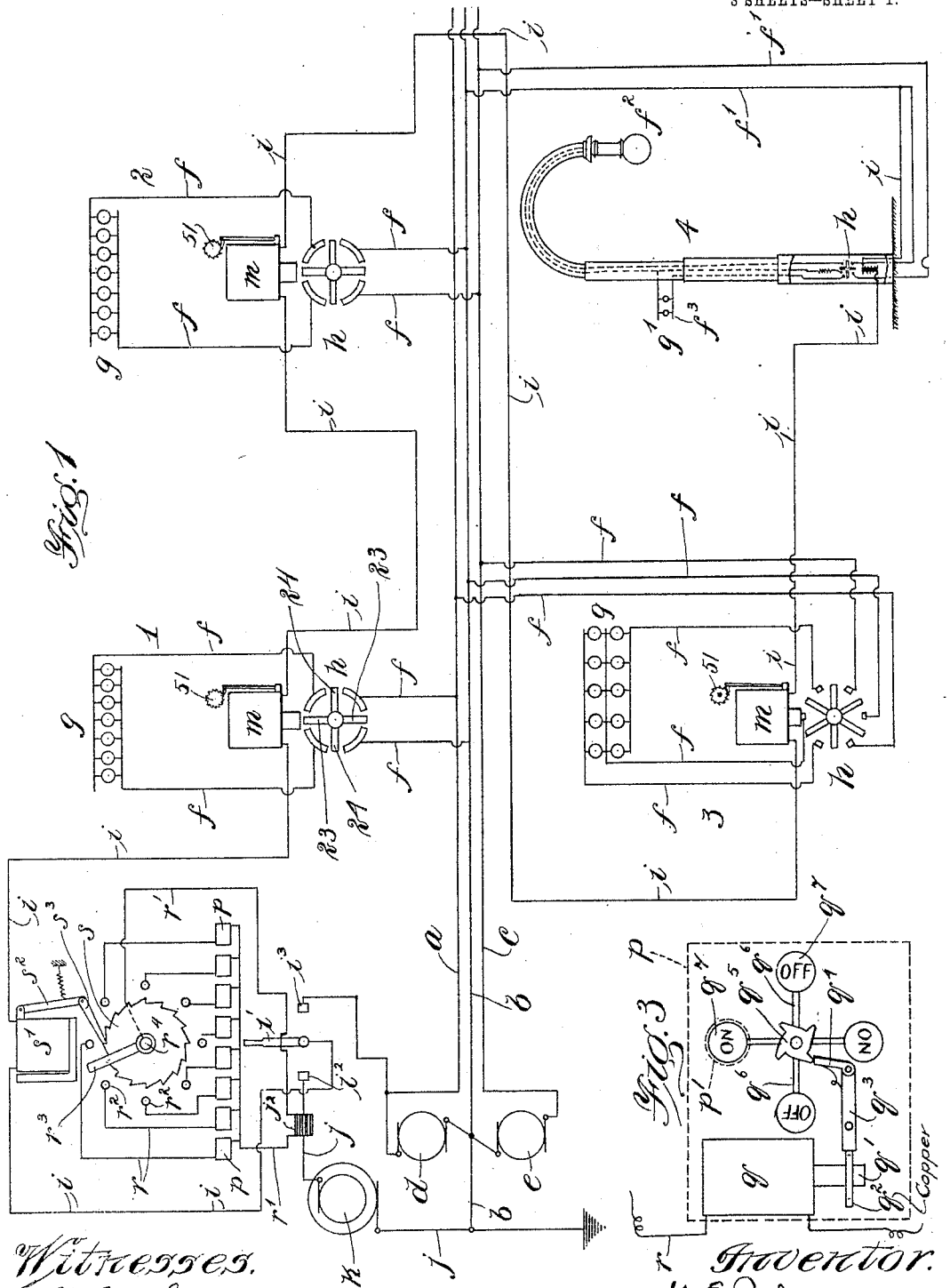

G. E. PALMER.
SYSTEM OF ELECTRICAL DISTRIBUTION.
APPLICATION FILED NOV. 23, 1904.
961,313.
Patented June 14, 1910.
3 SHEETS—SHEET 2.
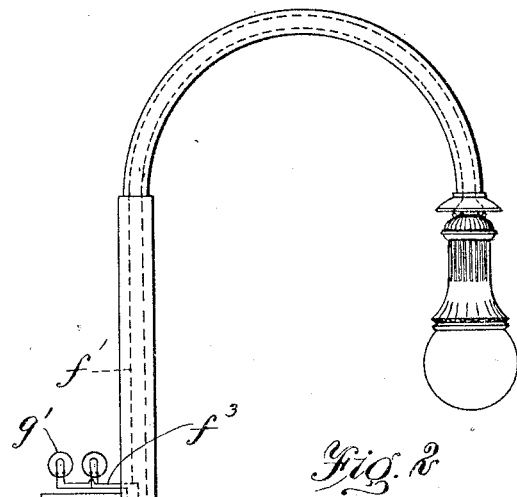
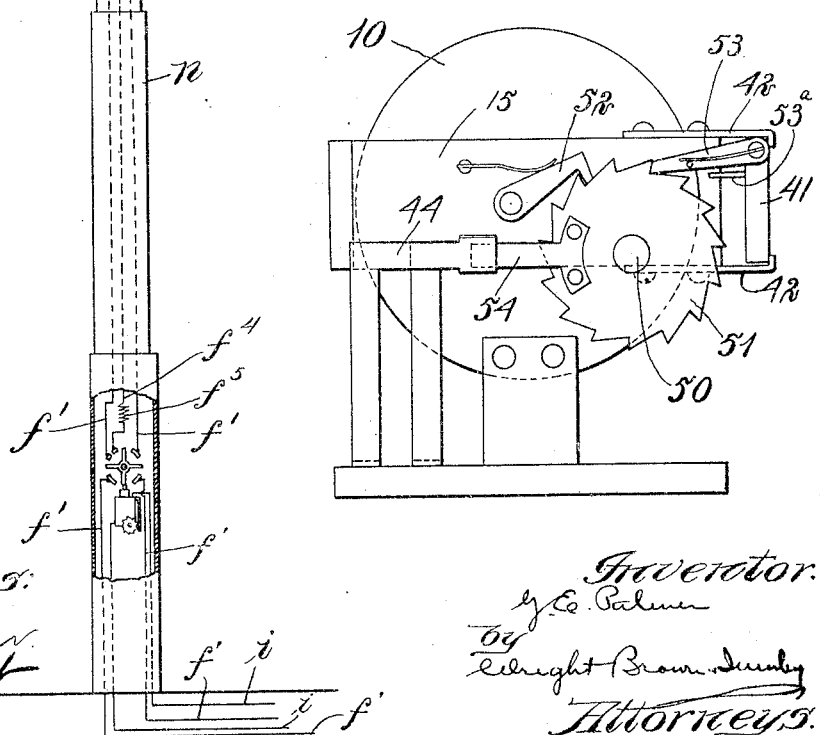

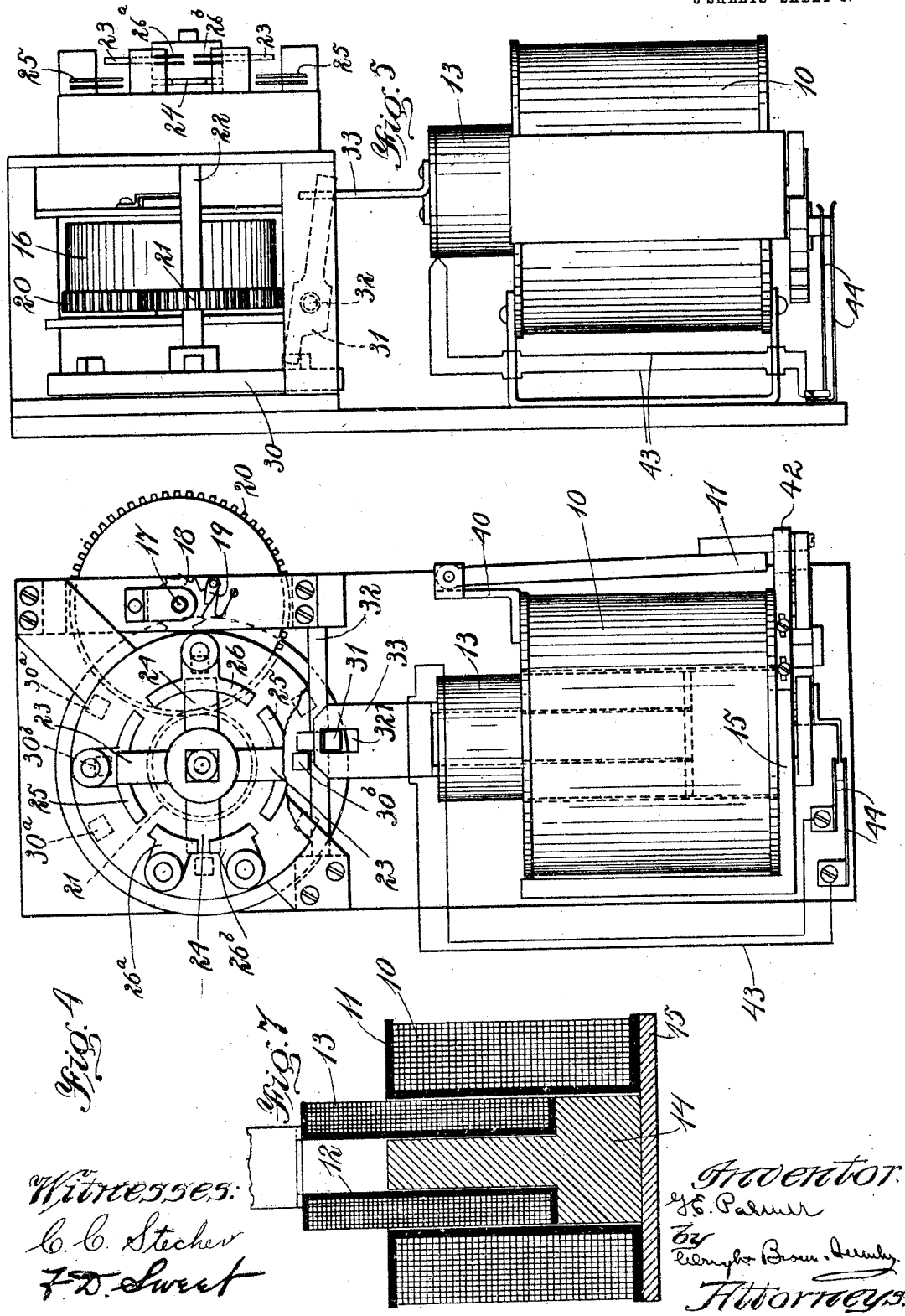

UNITED STATES PATENT OFFICE.

GRANVILLE E. PALMER, OF BOSTON, MASSACHUSETTS.

SYSTEM OF ELECTRICAL DISTRIBUTION.

961,313.  Specification of Letters Patent.  Patented June 14, 1910.

Application filed November 23, 1904. Serial No. 234,044.

*To all whom it may concern:*

Be it known that I, GRANVILLE E. PALMER, of Boston, in the county of Suffolk and State of Massachusetts, have invented certain new and useful Improvements in Systems of Electrical Distribution, of which the following is a specification.

This invention has relation to systems of electrical distribution, such as electric lighting systems, although it is applicable for a variety of uses and for employment in connection with various arts.

One phase of the invention has for its object to provide a system of remote control, by means of which a series or plurality of things or elements, such as electric lighting circuits, may be selected and subsequently acted upon independently of each other.

Another phase of the invention has for its object to provide independent motors for controlling independent elements such as light circuits, and means for selecting and controlling or effecting the actuation of the said motors independently of each other.

The invention has other objects, as will appear from the following specification.

Referring to the drawings: Figure 1 represents diagrammatically a system of electrical distribution in which there are a number of working or lamp circuits arranged in multiple branches with a switch in each branch, an independent motor for each switch, and a controlling circuit arranged to be connected with two generators of currents of different characteristics, in consequence of which one of the switches is selected for actuation or control by one current and is actuated or acted upon by another current. Fig. 2 represents an arc-lamp and a support in the base of which support is located the motor and switch for controlling the lamp circuit. Fig. 3 represents one of the indicators for showing the condition of the lamp circuit. Fig. 4 represents in front elevation a switch, a motor, and its electromagnetic controller. Fig. 5 represents a side elevation of the same. Fig. 6 represents a bottom view of the same. Fig. 7 represents a novel electromagnet which I employ.

Referring to the drawings, and particularly to Fig. 1,—$a$ $b$ and $c$ represent the conductors of a three-wire electric lighting system, the conductor at $b$ being the neutral wire. $d$ and $e$ represent respectively dynamos for generating a direct or continuous current of electricity, which are connected properly with the conductors of the three-wire system. Connected with the conductors $a$ and $b$, or $b$ and $c$, are lamp or working circuits arranged in multiple branches, as indicated at $f$ and $f'$, that at $f'$ being for the purpose of supplying current to an arc-lamp $f^2$. The translating devices or lamps in the various working circuits are indicated at $g$ $g$ $g'$, the lamps $g'$ being arranged in a circuit $f^3$ in series with the arc-lamp $f^2$, although said lamps are in multiple with each other. In each of the branch-circuits is placed a motor-actuated switch $h$, the details of which will be subsequently described. It is sufficient at this time to state that these motor-actuated switches are selected and independently actuated from the central station at which the dynamos $d$ and $e$ are located. Where there is a single branch circuit $f$, for each series of lights, as shown above the conductors $a$ $b$ $c$ in Fig. 1, a four-pole switch is utilized, but where the lamps $g$ are arranged in a three-wire system, as illustrated in the lower left-hand portion of Fig. 1, I employ a six-pole switch, each of the switches having the same number of contacts that it has poles or movable contacts. Each of the motors, and therefore the switches, is under control of an electromagnetic controller, the various controllers being arranged in series in a controlling circuit, which is indicated at $i$. One terminal of this circuit is connected with a switch-lever $i'$, at the central station, and the other terminal is connected with a conductor leading to the neutral conductor $b$. The switch-lever $i'$ is adapted to be moved into contact with either of two contacts, indicated at $i^2$ $i^3$ respectively. The contact $i^3$ is connected with one of the outgoing conductors from either the generator $e$ or the generator $d$, but is illustrated as being connected with the conductor $a$. The other contact $i^2$ is connected in a circuit $j$ which includes a generator $k$ for the generation of an alternating current, the circuit $j$ being at its other terminal grounded, the neutral wire $b$ being connected with the grounded circuit $j$. By reason of this construction and arrangement, it will be observed that by moving the switch-lever $i'$ in one direction or the other, there may be thrown upon the controlling circuit $i$ either a direct current or else an alternating or periodic current. In this connection, I may here state that I have devised an electromagnet which may be so constructed as to effect a movement of the armature when a direct current is passed through the coils thereof, and not when an alternating current is passed through the coils, or which may be so constructed that the armature will be actuated when an alternating current is sent through its coils, and not when a direct current, as shown in Fig. 7 and presently described, and this, I believe, is novel with me.

The electromagnet of the type first above referred to is permissibly formed as a solenoid, with its core or armature of iron. Around the core or armature is an endless coil of copper, the whole being so correlated that when a direct current is sent over the line, the armature is magnetically attracted, and is actuated; but when an alternating current is sent over the line, the secondary current set up in the copper coil about the core, tends to repel the core so as to neutralize the magnetic attraction of the core and thus prevent its actuation. In connection, however, with the present embodiment of the invention, I employ an electromagnet in which the armature is not moved by the passage of a direct current through the coils of the solenoid, but is actuated or moved only when an alternating current is sent through said coils. In Fig. 7, I have illustrated this novel magnet. The coils of the solenoid or magnet are indicated at 10, and they are wound upon a spool 11, as ordinarily. Within the spool is placed the armature, consisting of a bobbin 12, of some diamagnetic material, such as copper, wood, paper, or the like, and about which is wound an endless coil or series of coils 13 of copper wire. The armature or plunger thus formed is hollow and is arranged to move vertically upon a guide 14, arranged in the central aperture of the spool 11. Now it will be readily seen that when a direct current traverses the coils 10 and magnetic lines of force are set up, the armature will be unaffected thereby, and will remain immovable. When, however, an alternating current is sent through the coils 10, the current induced in the coil 13 will cause the plunger or core to be impelled outward or away from the coil 10 with sufficient force or power to accomplish certain mechanical results which are utilized in my remote controller system. It will be understood that unless the secondary circuit formed by the coils 13 is closed, the passage of an alternating current through the coils 10 will have no effect thereupon, and note should be taken of this as I rely on this fact in the utilization of this electromagnet in my system. The guide or support 14 is preferably formed of iron or other equivalent material, and it is connected to an L-shaped iron bar 15, so that when a direct current is passed through the solenoid, the ends of the bar 15 form magnetic poles for the attraction of a supplemental armature, as illustrated in Fig. 4.

For each of the switches $h$ I employ an electromagnetic controller, substantially similar to that illustrated in Fig. 7, as thus described, with certain additions, as will be explained, and these electromagnetic controllers which are indicated at $m$ $m$, respectively, are connected in series in the controlling circuit $i$, and are arranged in operative relation to the switches and their motors.

Referring now to Figs. 4, 5 and 6, I have therein shown a switch, its motor, and an electro-magnetic controller in operative relation. The motor may be of any suitable type, but for convenience and for other advantages secured thereby, I employ a spring-actuated motor. The spring, which is not shown in detail, is arranged in a case 16, and is connected to an arbor 17, the end of which is squared, to receive a crank-handle by which the spring may be wound. The arbor carries a ratchet 18 adapted to be engaged by a pawl 19 to prevent the spring from unwinding, and it also carries a large gear 20 which intermeshes with and drives a pinion 21 on the switch-arbor 22. The switch-arbor carries upon its forwardly projecting end poles or movable contacts 23 23, 24 24, in multiples of two. The poles or contacts 24 24 are arranged in a different plane from the contacts 23 23, and they are adapted to respectively engage stationary contacts 25 25, 26 $26^a$ $26^b$. The stationary contacts $26^a$ $26^b$ are relatively short and are arranged in proximity so as to be successively engaged by the contacts or poles 23, for a purpose to be explained. The terminals of the working circuits $f$ are connected with said stationary contacts and are illustrated diagrammatically in Fig. 1. Detent or switch controlling mechanism is provided and actuated by the electro-magnetic controllers, to permit the switch arbors to rotate with a step-by-step movement, so as to cut in or cut out the electric lighting circuits $f$ or $f'$, as the case may be. The motor and the switch-mechanism are mounted in a convenient frame or support, the details of which it is unnecessary to describe although I desire to point out that the switch is located in front, where it is convenient of access. The rear portion of the switch-arbor 22 carries a disk 30, upon which are placed a plurality of stops $30^a$ $30^b$, those indicated at $30^b$ being arranged relatively nearer to the center of the arbor than those at $30^a$. These stops are preferably formed of some hardened material such as steel, and they are adapted to be successively engaged by a movable detent or pawl 31, mounted upon a rockshaft or fulcrum 32. The said pawl is so fulcrumed that it has a longer end which projects into an aperture 321 formed in an arm 33, projecting upwardly from the top of the armature 13 of the electromagnet 10 which is located therebelow. When the said armature is raised, the pawl or detent is rocked about its fulcrum, and its shorter end releases one of the stops 30$^b$ and moves into the path of the next succeeding stop 30$^a$. As soon as the armature drops, the stop 30$^a$ is released and the end of the detent moves into the path of the next succeeding stop 30$^b$. By this means, the switch may be controlled or caused to rotate with a step-by-step or intermittent movement, to cut in or cut out a lamp circuit, as will be readily understood.

I have already explained that the electromagnet 10 is provided with a pole 15 and it will be observed by an examination of Figs. 4, 5 and 6, that, pivoted to a bracket 40, supported upon the top of the electromagnet 10, is a supplemental swinging armature 41. This armature is guided in its movement by adjustable guides 42, attached to the sides of the horizontal pole-piece 15, said guides having inwardly projecting ends which limit the outward movement of the supplemental or swinging armature 41. Any suitable means may be utilized for returning the armature 41 to the outward position after it has once been attracted by the magnet and then released thereby.

I shall now describe the mechanism by which the switches are selected for actuation or control, and the means by which the detent is caused to be actuated by the armature 13 after the switch has been selected, and I will first call attention to the fact that the coil 13 is connected in a copper circuit 43, the terminals of which are connected with two stationary contacts 44 44, below the electromagnet 10. These contacts are separated from each other so that unless they are short-circuited, the passage of an alternating current through the magnet 10 will not cause the repulsion of the armature 13, although it will cause the attraction of armature 41. In fact, the armature 41 will be attracted by the electromagnet when either a direct or an alternating current is sent through the coils 10. For the purpose of closing the circuit 43, there is journaled on a stud-shaft 50, projecting downwardly from the pole-piece 15 a ratchet 51 with which coacts a spring-pressed lazy-pawl 52. To the end of the swinging armature 41 is attached a spring-pressed pawl 53, so that when the armature 41 is attracted, the pawl 53 will move the ratchet 51 the space of one tooth. The armature 41 also carries a stud 53$^a$ for preventing the ratchet 51 from throwing over more than one tooth. Secured to the said ratchet is a circuit-closing device, consisting of an arm or finger 54 of conducting material, so located that when the ratchet reaches the proper point in its rotation, the arm 54 will engage the contacts 44 and close the circuit 43. It will be understood that for each of the lamp circuits there will be a switch mechanism with its motor, an electromagnetic controller, and a selector, as thus described. The ratchet 50 is provided with twice as many teeth as there are lamp circuits to be controlled. The arms 54 are adjustable (any suitable provision being made for this) and they occupy different relative positions upon the ratchets, so that no two of them will at any one time be located between their respective contacts 44. I employ teeth double in number to the lamp circuits, for reasons which I shall subsequently give in connection with a description of the arc-lighting circuit illustrated in Fig. 2.

I will now describe the operation of selecting a lamp circuit and then causing said circuit to be cut in or cut out, as the case may be.

It may be assumed that all of the lamp circuits shown in Fig. 1 are cut out, and in order that the lamp circuits may be distinguished from each other, I will number them 1, 2, 3, and 4, respectively. Let it be assumed that it is desired to cut in the branch-circuit $f$ at 1. To do this, the operator or engineer at the central station throws the switch-lever $i'$ into engagement with the contact $i^3$. This throws upon the circuit $i$ the direct current and as the electromagnet 10 is energized, the armature 41 is attracted to the pole-piece to impart one step to the ratchet 50. All of the other ratchets are similarly actuated simultaneously therewith. The engineer makes and breaks the circuit $i$ until from the indicating apparatus which I shall subsequently explain, the arm 54 is separated from the contacts 44 at 1 by the space of one tooth. Then the attendant reverses the switch-lever $i'$ and moves it against the contact $i^2$ so as to throw onto the controlling circuit $i$ an alternating current. Immediately the armature 41 is again attracted and moves the ratchet 51 one step to cause the circuit-closing device 54 to engage the contacts 44 and thus close the circuit 43 (at the lighting circuit 1) through the coil 13 of the armature or plunger. Immediately thereupon, the plunger is repelled to lift the longer end of the detent 31 so as to release the stop 30$^b$ and permit the motor to rotate the switch-arbor one step, so as to bring the contacts 23 23 and 24 24 (see Fig. 4 in connection with Fig. 1) into engagement with the contacts 26 26$^a$ and 25 25. The lamp circuit $f$ at 1 is now closed, but the attendant then breaks the circuit $i$ so that when the armature 13 drops, the switch-arbor will be advanced another step. The contacts 25 25 and 26 are long enough so that the switch-arbor may rotate two steps without the poles of the switch being disengaged therefrom. When the alternating current was thrown upon the line, it did not affect the other induction circuits 43 for the reason that said circuits were not then closed. Then, if the operator desires, he may go through the same steps in order to cut in another one of the lamp circuits, or he may, if desired, cut out the lamp circuit $f$ at 1.

In the use of constant potential arc-lights in cities and towns for municipal service, it is customary to include in the lamp circuit a resistance in series with the arc. This resistance may be composed of one or more incandescent lamps $g'$ in a lamp circuit $f^3$ in series in the circuit $f^2$, but on account of the momentary rush of current that takes place when the arc is first started, the use of an incandescent lamp resistance at that moment is not practical, so I employ, in addition to the incandescent lamp circuit, a starting resistance $f^5$. The resistance $f^5$ is in a branch circuit $f^4$, one terminal of said circuit being connected to the small contact $26^a$ and its other terminal being connected to the lighting circuit $f'$ between the arc lamp and the lamp circuit $f^3$. The two contacts $26^a$ $26^b$, as previously explained, are relatively near together, and they are so arranged as shown in Figs. 2 and 4, that when one of the pole-pieces 23 is moved into engagement with the contact 26, the oppositely extending arm or pole-piece makes contact with the stationary contact $26^a$, so as to close the arc-light circuit through the resistance $f^5$. The next time that the switch is moved forward one step, the pole-piece 23 slides from the contact $26^a$ to that indicated at $26^b$ so as to close the circuit through the lamps $g'$ and cut out the resistance $f^5$. The pole-pieces of the switch are wide enough so that in moving from the contact $26^a$, the contact $26^b$ will be engaged in time to prevent interruption of the circuit.

The motor, the switch, and the electromagnetic controller and selector mechanism may be located conveniently for each lighting circuit in a suitable casing; and where these mechanisms are utilized for controlling an arc-light, they may be located in the hollow base or support $n$, as shown in Fig. 2.

It is desirable, of course, that the engineer at the central station should be kept at all times informed as to the condition of each circuit, and hence I employ an indicator mechanism which is illustrated in Figs. 1 and 3, to which reference may be had. This mechanism comprises a plurality of separate indicators, each indicated as a whole respectively at $p$, and each indicator consists of an electromagnetic actuator and a movable index. There is one indicator for each light circuit, and the electromagnet of each is so constructed that the index will be operated only when an alternating current is sent therethrough. The electromagnet in each case consists of a coil $q$ having a depending guide $q'$, encircled by an endless copper ring $q^2$, adapted to move relatively thereto. The passage of an alternating current through the coils of the magnet $q$ causes a repulsion of the copper ring $q^2$ by reason of certain currents of electricity therein generated. This copper ring is in each case connected to a pivoted lever $q^3$ carrying on its ends a spring-pressed pawl $q^4$ adapted to engage and impart a step-by-step rotation to a four-toothed ratchet $q^5$. The ratchet is secured upon an arbor from which project four arms $q^6$. These arms are arranged as shown, and they carry upon their extremities disks indicated at $q^7$. Upon the disks are printed the words "On" and "Off", or other symbols which would indicate that the current is cut off from or is traversing a corresponding lamp circuit. This mechanism is inclosed within a suitable box which is apertured as at $p'$, so that only the disk on the upstanding arm may be seen. Each time an alternating current is sent through the electromagnet $q$, the ratchet $q^5$ will be advanced one step and one or the other of the disks $q^7$ will appear through the aperture $p'$. Each one of the electromagnets $q$ is an independent branch-circuit $r$ connected in series with a circuit $r'$ in shunt relation to a resistance $j^2$ in the line $j$. The terminals $r^2$ of the branch circuits are arranged in a circle so that they may be successively engaged by a contact-arm $r^3$, secured to an arbor $r^4$, to which the circuit $r'$ is terminally connected, so that when the arm $r^3$ engages any one of the terminal contacts $r^2$, the circuit will be closed through the electromagnet which is in circuit therewith. The arbor $r^4$ has secured upon it a ratchet $s$ which has as many teeth as any one of the ratchets 51. This ratchet is adapted to be given a step-by-step rotation, by means of an electromagnet $s'$, placed in series in a circuit $i$, said electromagnet having an armature $s^2$ carrying at its free end a pawl $s^3$, adapted to engage the teeth of the ratchet $s$. The terminal contacts $r^2$ and the arm $r^3$ are exposed to view behind a glass plate, and the terminal contacts are severally numbered, to correspond to the various lamp-circuits, so that when the arm $r^3$ is engaged with one of the contacts $r^2$, the engineer will know that the circuit-closer 54 of the corresponding circuit is engaged with the contacts 44 of the selector for said circuit. The electromagnet $s'$ is so wound and constructed that the armature $s^2$ is attracted by the passage of either a direct or an alternating current through the coils thereof. From this it will be seen that when the operator, by closing the switch-lever $i'$, upon the contact $i^3$, sends a direct current over the line in successive impulses, the arm $r^3$ will be rotated step-by-step in synchronism with the circuit-closers 54, and that when the arm $r^3$ is one step removed from the terminal $r^2$, which corresponds to the lamp circuit which the engineer is desirous of cutting in or cutting out, the engineer may then throw upon the line an alternating current which will have the effect of cutting in or cutting out the light, and at the same time of energizing the electromagnet $q$ in the circuit $r$, just referred to, to rotate the indicator one step, and thus show that the light circuit has been cut in or cut out, as the case may be. In other words, the ratchet $s$ and arm $r^3$ correspond to the ratchets 51 and circuit-closers 54, while the magnet $q$ and the actuating lever $q^3$ correspond to the coils 10 and the armature-coils 13 and the pawl 31 of the electromagnetic switch-controllers. In the former case, the ratchet $s$ and arm $s^3$ are advanced each time a current, either direct or alternating, is thrown on the line; whereas the levers $q^3$ are actuated only when an alternating current is thrown on the line and the arm $r^3$ and circuit-closers 54 have reached a predetermined position. Thus the indicating mechanism, as a whole, comprises a selector for an indicator and means for actuating the indicator after it is selected.

In the installation of an apparatus such as herein described, it is desirable that the pivoted armatures 41 should be so related to the poles 15 that no one of them will be attracted without a simultaneous attraction of all of the others, and it is for this reason that the guides 42 are made adjustable for the purpose of limiting the movement of said armatures away from the pole-pieces of the magnet.

In the employment of a motor of the spring type, I preferably employ a relatively short train of gearing, and a strong and durable spring, the whole being so constructed that it need not be rewound oftener than once a week.

I desire it to be understood that my invention is not limited to the particular system or the particular instrumentalities which I have seen fit to herein illustrate and describe, although they are the best embodiments of the inventions now known to me; and I further desire it to be understood that the phraseology which I have herein employed and which I employ in the appended claims is for the purpose of description and not of limitation.

Having thus explained the nature of the invention, and described a way of constructing and using the same, although without attempting to set forth all of the forms in which it may be made, or all of the modes of its use, I declare that what I claim is:—

1. A system of electrical distribution comprising a plurality of lighting circuits, each having a rotary switch, an independent motor for each switch, a motor controller having a detent for controlling said motor whereby said motor imparts a step-by-step rotation to said switch, and a controlling circuit having means for selectively effecting the operation of the detent of any one of said motor-controllers independently of the others.

2. A system of electrical distribution including a plurality of lighting circuits each having an independent rotary switch, an independent motor for each switch, an independent detent for controlling each switch in consequence of which said switch has an intermittent movement to cut in and cut out its corresponding circuit, an actuator for each detent, a selector for each detent, and a controlling circuit governing said selectors and actuators but independent of said motors, whereby electrical impulses sent through said circuit effect the selective operation of any one of said devices to cut in or cut out the corresponding working circuit.

3. A system of the character described, comprising a plurality of lighting circuits, a rotary switch for each said circuit, a motor for each switch, a controller for each motor, a controlling circuit, means for throwing either a direct or an alternating current on said controlling circuit, and mechanisms in said latter circuit operative in response to a direct current to select any controller for actuation, and operative by passage of an alternating current to actuate such selected controller.

4. A system of the character described, comprising a plurality of elements, a plurality of independent devices for acting on said elements, a plurality of selectors for rendering said devices independently operative, a controlling circuit for said devices and selectors, and means for causing alternating and direct currents to pass through said controlling circuit, said selectors being constructed for operation by both alternating and direct currents, and said devices being operable only by alternating currents.

5. A system of the character described, comprising a plurality of working circuits, each having an independent switch, a mechanical motor for operating each switch to cut in or cut out its corresponding working circuit, a detent which is operable to permit an intermittent movement of each switch by its motor, a controlling circuit, means for causing currents of different characteristics to pass through said controlling circuit, electromagnetic controlling mechanisms in series in said circuit, and selecting mechanisms operated thereby, by which a detent is selected for operation by a current of certain characteristics and is operated by a current of different characteristics.

6. A system of the character described, comprising an electric lighting circuit, a switch therefor, and an electrical device for controlling said switch, consisting of a circuit including a primary coil, a closed secondary coil in inductive relation to the primary coil, means whereby the movement of said secondary coil controls said switch and means for throwing on said circuit an alternating current whereby said secondary coil is repelled by said primary coil but is not affected by direct current.

7. A system of the character described, comprising a lighting circuit, a switch therefor, and an electrical device for acting upon or controlling said switch, consisting of a circuit including a primary coil, a closed secondary coil in inductive relation to the primary coil, means governed by said secondary coil for controlling said switch, an alternating current generator in the said circuit, and means for opening and closing the inductive circuit through the secondary coil to control its repulsion from the primary coil.

8. A system of the character referred to comprising an electric lighting circuit, a switch therefor, a circuit having a primary coil in series, means for throwing an alternating current into said circuit, a secondary coil in inductive relation to said primary coil to be repelled thereby when an alternating current is on said circuit, means whereby the movement of said secondary coil controls said switch, a device for making and breaking the inductive circuit through said secondary coil, and a magnetically-operated device which operates said make-and-break device.

9. A system of the character referred to comprising a plurality of elements to be controlled, a circuit having a plurality of primary coils which constitute electromagnets, each having a magnetically actuated armature, and a device for controlling each element, each device consisting of an induction coil set in inductive relation to one of said primary coils and also in operative relation to said element, means by which said induction coil is controlled in operation by said armature and means by which alternating and direct currents may be thrown on to said circuit.

10. A system of the character referred to, comprising a plurality of elements to be controlled, a circuit having a plurality of primary coils which constitute electromagnets, each having a magnetically-actuated armature, and a device for controlling each element, each device consisting of a coil set in inductive relation to one of said primary coils and also in operative relation to said element, devices operated by said armatures for opening and closing said secondary coils to control their operation and means by which alternating and direct currents may be thrown on to said circuit.

11. A system of the character referred to comprising a plurality of elements to be controlled; a plurality of independent secondary coils in operative relation to said elements to control them; a circuit having electromagnetic mechanisms consisting of primary coils in inductive relation to said secondary coils, armatures for said primary coils which are actuated when an alternating or a direct current is on the circuit; and means operated by said armatures for closing and opening said secondary coils according to any predetermined arrangement.

12. A system of the character referred to, comprising a plurality of working circuits each having an independent switch; a plurality of independent secondary coils controlling the operation of said switches; a circuit having electromagnetic mechanisms consisting of primary coils in inductive relation to said secondary coils; armatures for said primary coils which are actuated when an alternating or a direct current impulse is on the circuit; means operated by said armatures for closing and opening said secondary coils according to any predetermined arrangement and means by which alternating and direct currents may be thrown on to said circuit.

13. The combination of a working circuit, a switch therefor, a motor for actuating the switch, a detent mechanism for controlling the operation of the switch, a secondary coil for mechanically operating the detent mechanism, and a primary coil in inductive relation to the secondary coil.

14. The combination of a working circuit, a switch therefor, a motor for actuating the switch, a detent mechanism for controlling the operation of the switch, a secondary coil for mechanically operating the detent mechanism, a primary coil in inductive relation to the secondary coil, a controlling circuit including said primary coil, means under control of said primary coil for opening and closing said secondary coil to control its operation and means by which alternating and direct currents may be thrown on to said circuit.

15. A system of the character referred to comprising a plurality of working-circuits each having an independent switch, a motor for actuating each switch, a device for controlling the operation of each motor, and means for selectively operating said controlling devices, said means consisting of a controlling circuit including a plurality of primary coils each constituting an electromagnet and each having an armature; a secondary coil in inductive relation to each of said primary coils, and in operative relation to one of said motor-controlling devices; a circuit-closer for each of the induction coils; means controlled by said armatures for operating said circuit-closers, and means by which alternating and direct currents may be thrown on to said circuit.

16. A system of the character referred to comprising a plurality of working-circuits each having an independent switch, a motor for actuating each switch, a device for controlling the operation of each motor, and means for selectively operating said controlling devices, said means consisting of a controlling circuit including a plurality of primary coils, each constituting an electromagnet and each having an armature; a secondary coil in inductive relation to each of said primary coils, and in operative relation to one of said motor-controlling devices; a circuit-closer for each of the induction coils; ratchet mechanisms operated by said armatures for actuating said circuit-closers, said circuit closers being connected to said ratchets in different relative positions, whereby said secondary coils are opened and closed in sequence and means by which a direct or an alternating current may be thrown on to said circuit.

In testimony whereof I have affixed my signature, in presence of two witnesses.

GRANVILLE E. PALMER.

Witnesses:
M. B. May,
C. C. Stecher.